US012599114B2

(12) United States Patent (10) Patent No.: US 12,599,114 B2

Kovarik (45) **Date of Patent: \*Apr. 14, 2026**

(54) COVER FOR A RETRACTABLE DOG LEASH

(71) Applicant: Joseph E. Kovarik, Englewood, CO (US)

(72) Inventor: Joseph E. Kovarik, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/272,014

(22) Filed: Jul. 17, 2025

(65) Prior Publication Data

US 2025/0344675 A1 Nov. 13, 2025

Related U.S. Application Data

(63) Continuation of application No. 19/036,202, filed on Jan. 24, 2025, now Pat. No. 12,364,251, which is a continuation of application No. 17/138,243, filed on Dec. 30, 2020, now Pat. No. 12,219,930.

(60) Provisional application No. 62/954,848, filed on Dec. 30, 2019.

(51) Int. Cl.
  *A01K 27/00* (2006.01)
  *A41D 19/00* (2006.01)

(52) U.S. Cl.
  CPC ........ *A01K 27/004* (2013.01); *A41D 19/0024* (2013.01)

(58) Field of Classification Search
  CPC .... A01K 27/004; A01K 27/00; A01K 27/003; A01K 27/008; A41D 13/085; A41D 13/081
  See application file for complete search history.

(56) References Cited

U.S. PATENT DOCUMENTS

| | | | |
|---|---|---|---|
| 41,146 A | 1/1864 | Gay | |
| 566,642 A * | 8/1896 | Wilhelm | A41D 13/081 |
| | | | 2/66 |
| 2,727,241 A | 12/1955 | Smith | |
| 4,408,355 A | 10/1983 | Brock | |
| 5,345,610 A | 9/1994 | Belanger | |
| 5,375,263 A * | 12/1994 | Cuccia | A41D 13/085 |
| | | | 280/821 |

(Continued)

FOREIGN PATENT DOCUMENTS

| | | | | |
|---|---|---|---|---|
| DE | 202012011785 U1 * | 1/2013 | ......... | A41D 19/0017 |
| DE | 202012011785 | 2/2013 | | |

(Continued)

*Primary Examiner* — Kristen C Hayes
(74) *Attorney, Agent, or Firm* — Sheridan Ross P.C.

(57) ABSTRACT

A hand and animal leash cover includes a reversibly attachable, flexible, shape-retaining cover configured to surround an individual's hand while holding a leash retracting device. The cover includes a first opening for a human hand, dimensioned so that a user can grip the handle of a retractable leash and operate its features. The cover is at least semi-rigid so that it maintains its shape, which facilitates easy engagement and disengagement of a person's hand when grasping the retractable leash device. A strap is configured to wrap around a distal portion of a retractable leash to hold the cover to the leash. Preferred covers have an insulation layer encircling the interior of each cover end, leaving an interior portion free of insulation to facilitate the operation of the leash.

14 Claims, 3 Drawing Sheets

(56) References Cited

U.S. PATENT DOCUMENTS

| | | | |
|---|---|---|---|
| 5,678,249 | A | 10/1997 | Smith |
| 5,699,632 | A | 12/1997 | Stout et al. |
| 5,740,700 | A | 4/1998 | Redmond |
| 6,045,732 | A | 4/2000 | Nakatsuji |
| 6,314,917 | B1 | 11/2001 | Ryan |
| 8,826,865 | B2 | 9/2014 | Bogdahn et al. |
| 8,839,745 | B1 | 9/2014 | Johnston |
| 12,219,930 | B2 | 2/2025 | Kovarik |
| 12,364,251 | B2 | 7/2025 | Kovarik |
| 2011/0155076 | A1* | 6/2011 | Charette .............. A01K 27/008 |
| | | | 2/158 |
| 2012/0186539 | A1 | 7/2012 | Johnston |
| 2012/0240301 | A1 | 9/2012 | Gustafsson |
| 2016/0058082 | A1* | 3/2016 | Stone ................. A41D 19/0013 |
| | | | 2/158 |
| 2016/0095364 | A1 | 4/2016 | Kafka |
| 2016/0108564 | A1 | 4/2016 | Topolkaraev |
| 2016/0302499 | A1 | 10/2016 | McMahon |
| 2018/0338474 | A1 | 11/2018 | Bogdahn et al. |

FOREIGN PATENT DOCUMENTS

| | | | | |
|---|---|---|---|---|
| DE | 202014102716 | U1 * | 3/2015 | ......... A41D 19/0017 |
| EP | 2878218 | A1 | 6/2015 | |
| IT | 202200009158 | | 11/2013 | |
| IT | 202200009158 | A1 * | 11/2023 | ........... A01K 27/004 |

* cited by examiner

COVER FOR A RETRACTABLE DOG LEASH

RELATED APPLICATION

This application is a continuation of U.S. application Ser. No. 19/036,202, filed Jan. 24, 2025 (now U.S. Pat. No. 12,364,251, issued Jul. 22, 2025), which is a continuation of U.S. application Ser. No. 17/138,243, filed Dec. 30, 2020 (now U.S. Pat. No. 12,219,930, issued Feb. 11, 2025), which seeks priority from U.S. Provisional Patent Application No. 62/954,848, filed on Dec. 30, 2019. The entire disclosure of the prior applications is considered to be part of the disclosure of the accompanying application and is hereby incorporated by reference.

FIELD OF THE INVENTION

The present invention is directed to a method and system employing a cover for a retractable dog leash that includes a reversibly attachable, flexible, shape-retaining shell configured to surround an individual's hand while holding a leash retracting device.

BACKGROUND OF THE INVENTION

Pet owners, and specifically dog owners, daily walk their pets on leashes in adverse weather conditions, including wet or cold weather. Various types of gloves or mittens may be used to keep an individual's hands warm while walking a dog. However, it is often difficult for an individual with conventional gloves or mittens on to hold an animal leash, especially a retractable one, without compromising warmth and comfort. Especially when employing a retractable leash, the hands and fingers of the pet owner are exposed and become cold. Dogs often defecate on their walks and responsible owners need to pick up such waste, often requiring them to remove their gloves in order to pick-up the excrement in a plastic bag. Restraining a dog that is more interested in continuing its walk, removing gloves, picking-up excrement on the ground, and then placing it into a plastic bag can be challenging.

There is a need for a method and system that can be employed to make a pet owner's walk with their pet more enjoyable, maintaining their hands in a general state of comfort while facilitating all the duties an owner has while on their daily walks with their pet.

In various embodiments, the leash cover of the present invention is particularly useful when used with a retractable dog leash, which typically include a flexible strap attached at one end to a spool located inside a rigid housing containing a spring rewind mechanism. A locking lever is mounted on the housing—often at a top region of the housing—that allows the user to selectively lock and unlock the rewind mechanism. The housing includes an exit port on its front or top surface (or positioned largely opposite the end of the housing that has a handle grip) so that the leash is permitted to reversibly exit such port. A hand grip is formed on the rear surface of the housing that enables the user to hold a pistol or other suitable grip. Such retractable leashes are sold in different sizes for different size dogs and different sized hands of a pet owner, with one of the top selling retractable leashes being made by Flexi™.

One problem with existing retractable leashes is that when a pet owner wears a glove on the hand holding the retractable leash, the size and thickness of the glove may prevent the user from securely gripping the hand grip and/or prevent manipulation of the features of the retractable leash, such as the top-mounted locking lever that controls the tether provided to a pet.

Prior art devices have attempted to address the problems above in a variety of ways, including providing covers that extend completely around the retractable leash, with others providing enclosures that have elastic bands or closure members such that the dog owner can cinch up the opening around their arms/wrists to avoid cold air from entering such an enclosure. But such prior art devices present problems encountered in attempting to swiftly exchange hands that hold the pistol grip of the retractable leash so as to facilitate bagging of the dog's waste when on a dog walk, or to otherwise enable a pet owner to quickly dissociate from the retractable leash and have a bare hand available for particular tasks. As an example of the difficulties experienced when using prior art devices, US Patent publication No. 2011/0155076 to Charette discloses a mitt "that is flexible" and that encloses the entirety of a retractable leash as well as the hand of an individual who is holding the leash. Charette's mitt includes an opening with a re-closeable member (e.g. a zipper) to close such opening, and another opening at the front end of the covering having a lip and a securing means to seal warm air inside the mitt when the hand is enclosed therein, by closing the opening around the pet owner's arm or wrist. Charette's mitt or glove is also made from a flexible material, such as fleece, terry cloth, etc. that does not effectively retain its shape so as to permit a user's hands to be easily inserted without the need to employ one's other hand to assist in opening such opening.

Cumbersome material that collapses on itself, fails to retain its shape, and that requires a user to open the entrance cavity to insert one's hand so as to grip the retractable leash, actually complicates the situation by requiring a user's other hand to be employed in getting a hand repositioned onto a grip of the retractable leash. There is a need for a method and system that permits a dog owner to maintain their hands in a relatively comfortable enclosure, thus protecting them from the wind, cold and rain/snow, all the while making it easy for the user to not only operate retractable dog leash features, but to also exchange hands when conducting dog waste retrieval operations without the above mentioned problems experienced when using the prior art devices. The present invention provides a device and method that permits a user to have his/her bare hand contacting a retractable leash pistol grip while maintaining a warm environment around the user's hand while walking a pet and gripping such a pistol grip. This is accomplished in a fashion that does away with the restrictions inherent in the use of prior art mittens or all-enclosing leash structures that, while keeping a user's hands warm, tend to complicate the ability of a pet owner to quickly address the waste disposal issues encountered when walking a pet, e.g. being able to quickly dissociate one's leash gripping hand from a warmth covering device, as well as being able to quickly enter the warmth covering device without the need to involve one's other hand in the process. The present invention addresses this issue in a simple, economical manner that provides desired warmth for a user's hand while facilitating all other pet owner duties while on a pet walk far easier than if one employed prior art devices.

SUMMARY OF THE INVENTION

The present invention is not directed to a device that has a glove-shaped outer shell; nor a device that completely surrounds a retractable leash, nor that covers a portion of a leash retracting device where the leash enters/exists. Instead, the present invention provides for a user to maintain his/her hand that grips a retractable leash in a warm environment, protected from the exterior weather elements, but that does not encumber the association and dissociation of a person's hands with a retractable leash grip. Prior art devices both encompass the entire retractable leash and also provide for a wrist constricting feature, that, while well intentioned, (e.g. to prevent cold air from reaching the user while gripping the leash) prevents a user from quickly removing his/her bare hand so as to address attention to a pet while on a walk. The present invention does not employ, i.e. is devoid of, any elastic band or pullable cord around a user's wrist that causes the hand opening of a leash cover to close so as to conform to the user's wrist to reduce heat lost.

The present invention provides a way for a pet owner to quickly and efficiently put on and remove a covering that is reversibly but firmly associated with a retractable leash without having to wear gloves or mittens, while still being comforted from the cold or harsh conditions that they may experience on a walk with their pet.

Nor does the present invention, in contrast to some prior art devices, employ any wrist strap or tether that couples an outer shell to the walker's arm.

While an enclosed pistol grip is certainly a popular choice, because of the different hand sizes of individual, a particular pistol grip may not be suitable or comfortable for every user. As such, in various embodiments of the present inventions, a cover is made that facilitates its use with other configured/designed grips, such as the one disclosed by Bogdahn, et al. in U.S. Pat. No. 8,826,865.

To accomplish one object of the present invention, a leash cover includes a generally cylindrical structure, preferably having a larger sized first end through which one's hand enters than the other second end, where the leash housing is encircled. Through the slightly larger end, a person's hand can enter and extend to grip the leash with one hand. The cylindrical structure in some embodiments comprises a tubular member that maintains an open end so a user can grip a retractable leash with a bare hand. The opposite end, through which one can fit the leash housing, is preferably sized to encircle the leash housing at a point next to where the leash itself exits the housing. Preferably that end of the cylindrical structure has elastic characteristics such that it fits snuggly against the leash housing, closing off any spaces through which cold air could enter. In a preferred embodiment, this is achieved by employing a foam backed fabric having elastic qualities—at least in one direction—such that when properly aligned, the fabric, formed into the above referenced cylindrical shape, can stretch to fit the leash housing at the above referenced point next to the aperture through which the leash extends. In even more preferred embodiments, there is a segment of fur, such as artificial fur, that is attached to the inner surface of both the first and second end of the cylindrical structure, and encircling the interior portion of each end of the cylindrical structure, thus forming a barrier to cold air entering the cylindrical structure from either end. In other words, with a strip of fur lining the two ends of the tubular structure, the person's coat sleeve will contact the first/fur encircled end and will effectively seal against the fur strip that encircles the inner circumference of the first end. The fur strip that is attached to the second end likewise seals off any cold air that would otherwise enter through any spaces around the outer circumference of the leash housing. Preferably, the interior space within the cylindrical structure does not have fur so as to permit a spacious area for a person's hand to grip and operate the retractable leash. Indeed, the stretchable fabric/foam in preferred embodiments provides additional room for a pet owner's hand to stretch the interior dimensions of the tubular structure so as to operate the leash locking features, thus eliminating the need for additional structures (as described herein) that provide for space within the tubular structure required to operate the leash features. Having said this, other embodiments include those where fur is employed through a majority if not all of the interior of the tubular structure.

In still other embodiments, one can adjust the features of the present invention to address conditions brought on by various weather and temperature conditions by adding layers of material that can be connected or otherwise attached to the exterior of the cylindrical structure. In certain embodiments, the exterior of the cylindrical structure can be encircled with waterproof material, windproof material, insulative material, etc. Such layers can be attached to the exterior of the tubular structure via hook and loop structures (VELCRO™), snaps, zippers, or other suitable attachment features known by those of skill in the art. For example, a preferred embodiment of the present invention includes the basic structure of the cylindrical shaped material comprising head liner material (used to cover the interior of automobiles), which is a foam and fabric material that is somewhat permeable to air, thus making it desirable as it provides protection from the exterior environment while permitting some air flow and vapors to pass therethrough. Thus, use of such material provides for significant warmth via the heating of the interior of the cylindrical member by a person's hand residing therein, while still permitting for some air flow through the material, thus avoiding undue moisture buildup via perspiration, etc. But in very cold environments, the head liner material may be too porous for comfort, and in such situations one can add one or more layers to the exterior of the cylindrical member to provide for a warmer interior space, and thus comfort for a pet owner's hand when using the same.

Certain embodiments employ hand warmers, such as chemical hand warmer packets, which can be placed inside the semi-rigid or rigid leash cover of the present invention, with various embodiments having pockets inside the cover and adjacent insulation material, such that the partially open confines of the leash cover remain warm when a pet owner's hands are inside the cover.

The leash cover of the present invention can also, in some embodiments, include pockets or enclosures that can house waste bags to use when the pet defecates, as well as to store small amounts of pet treats, chemical warming packets, etc.

While certain embodiments include the provision of a hook and loop strip along respective width-wise edges of the tubular member, thus permitting one to undo the construct by simply separating the hook and loop attachment device to lay the device flat, the attachment of the width-wise edges can be done via adhesives, snaps, zippers, etc. to achieve the ultimate tubular structure that encircles a person's hands while holding the grip of a retractable leash. To reversibly secure the hand cover (otherwise referred to herein as a "leash muff" or "leash pocket") to the leash housing itself, a preferred embodiment includes a strap, preferably an elastic strap, that connects one side of the second end (the end that encircles the leash housing) to another side of the second end such that the tubular member is restrained against the leash housing due to the elastic constriction of the foremost portion of the leash housing being pulled back to the cylindrical structure by the elastic forces applied by the elastic strap. Such a strap (preferably elastic) can be secured to the leash pocket via hook and loop structures, snaps, adhesive, etc. The cylindrical structure is inhibited from moving to the front of the leash housing by the physical restriction imposed by the curvature of the leash housing just below the griping structure of the leash housing. In other words, the cylindrical structure is relatively firmly in its functional position when placed on the leash housing such that approximately $\frac{2}{3}^{rd}$s of its extent runs from the gripping portion of the inserted leash housing, with about $\frac{1}{3}$ of the leash pocket covering the gripping portion of the retractable leash. In other words, the last $\frac{1}{3}^{rd}$ of the cylindrical structure extends over the leash housing and terminates, with reference to the top of the leash housing, prior to the aperture for the leash to exit. The length of the cylindrical structure is variable but is preferably such that from the aperture through which the leash exists, to the sleeve of a pet owner's coat (in circumstances where it is cold outside and coats are worn) the length of the cylindrical structure is preferably about 8 inches, but can be from about 7 to about 10 inches or longer if desired. As noted above, the structure is at least slightly conical such that the first end where a person inserts their hand is more open, and wider in at least a vertical or horizontal perspective, than the second end that encircles the leash housing. In contrast to prior art leash covers, embodiments of the present invention retain on open first end such that a pet owner can freely and repeatedly insert or withdraw their hands to facilitate waste cleanup of their pet, e.g. by simply placing the leash pocket under a person's opposing armpit, withdrawing one's hand form the leash pocket, so as to permit the bare hand of the pet owner to don a plastic bag to pick up pet refuse. The pet owner can then reinsert their hand into the open first end of the leash pocket when the waste is bagged.

The fur strips that preferably surround the circumference of at least one, but preferably both first and second interior ends of the cylindrical structure, are preferably at least about 1-2 inches in width, but can be wider despite the preference for more room in the interior of the cylindrical structure that would be occupied by such fur material. As one of ordinary skill in the art will appreciate, other insulative materials, e.g. felt, soft fabric, etc. can be used instead of fur to achieve the purpose of blocking cold air from entering the leash pocket and preferably entails at least about one inch width of material connected to the interior circumference of the first and second openings. In other embodiments, the leash pocket is integral with a leash housing such that the second end is affixed to the leash housing and is not reversibly detachable. Moreover, certain embodiments permit construction of the leash pocket via a flat section of head liner material being cut to form a polygon with a shorter top side than the bottom side, and with angled sides, with the angled sides having attachment means to join them together. Such attachment means may include hook and loop coordinating structures, snaps, zippers, buttons, etc.

In preferred embodiments, the leash cover of the present invention is constructed so that about half of the retractable leash is covered by the leash cover while the other half is not—with the half being covered being adjacent to the grip or handle of the retractable leash. Prior art leash covers either cover the entire leash or the portion of the leash farthest from the pet owner's bare hand when gripping the retractable leash. The present invention is distinguished in various ways from prior art leash covers, with the fact that preferred embodiments of the present invention cover just about half of the retractable leash being but one of them; the leash cover provides an "always open" configuration, etc. The ability of a pet owner to employ their retractable leashes so that they can grip the same in adverse weather conditions while having their hand inside a tubular protective cover that provides warmth and protection from rain/snow without the person having to wear gloves, all the while providing for a bare hand to grip the retractable leash, making operation thereof much easier, satisfies a long felt but unsolved need.

While the open-ended nature of the leash pocket provides the above referenced advantages over prior art covers that include material that is not stiff enough to retain an open configuration, as well as include wrist-tightening cords or wrist contacting sleeves, etc., another distinction of the leash pocket is that its second end is similarly open to receiving a retractable leash housing via simple insertion into the second opening. The leash housing is inserted up to a point just before the aperture through which the leash extends, thus avoiding any interference between the leash pocket and the functional operation of the retractable leash.

The leash cover of the present invention, in several embodiments, has a securing mechanism to permit reversable attachment of the leash cover to the outer housing of a retractable leash. In various embodiments, the securing mechanism may employ an elastic member (such as an elastic band) that can reversibly secure the cover to the retractable leash, while the other end of the leash cover can protect the hands of a pet owner while on a walk with their pet, and the leash cover can be easily removed thereafter so that on warmer days, the cover can be removed from the retractable leash, e.g. the leash cover can be readily disengaged. In certain embodiments, the leash pocket can be folded or rolled back from the first end to expose more of a person's bare hand when gripping the retractable leash, thus providing for a pet owner with the ability to accommodate for temperature and comfort.

Other ways to secure the leash cover can be employed, including but not limited to the use of hook and loop fasteners that can have their corresponding surfaces placed either on the outside housing surface of a retractable leash (preferably the "hook" surface of a VELCRO™ two-part construction) such that the insulation material (or the "loop" component of a hook and loop construct) used on the inside surface of the cover leash (e.g. to provide the comfort for a user's hands when inside the cover), can be attached to the hook structure on the retractable leash's outer surface, e.g. achieving a VELCRO™—like attachment.

In various embodiments, the invention can be characterized as a "leash muff" as it acts like a muff for which one end remains open for easy entry of a person's hand, while the other end is secured around the housing of a retractable leash body. Without intending to limit the scope of the various embodiments of the present invention, the term "lease muff" as used herein generally refers to a tubular cavity for a pet owner's hand, inside of which may be covered with fur or other insulated material. In various embodiments, neoprene material is employed on at least a portion of the leash muff due to its attractive features, including its ability to retain warmth, and because it is stretchable so that it can be stretched around the exterior of a retractable leash body or housing in a manner that reversibly secures the "leash muff" to the retractable leash itself. Neoprene material can, in some embodiments, form the entirety of the cover as described herein, provided that the neoprene material is selected to have the requisite stiffness such that an opening for one's hand is retained such that it is not necessary for a person to use their other hand to open the leash muff's opening to permit entrance of the gripping hand therein. The ability of the leash muff to retain a generally tubular shape at the end where a person's hand enters to grip a retractable leash, separates it from the prior art devices that are directed to maintaining a pet owner's hands warm. Unlike prior art devices, the present invention provides a way to maintain a user's hands in a warm environment while gripping a retractable leash in cold weather, while gripping a retractable leash with one's bare hands, but also enabling the user to quickly remove their hand from the retractable leash without the need to release constrictive cords around their wrists.

As one of skill in the art will appreciate, other similar materials can be employed in fashioning various embodiments of the present invention, provided that the characteristics of suitable embodiments include at least the following two capabilities: that one end of the leash muff securely and reversibly attach around the entirety of a body of a retractable leash device, extending about half way (and not all the way) to the front end of the retractable leash; and that the opening for a person's hand remains open to an extent that a person can reversibly engage the grip or handle portion of the retractable leash without assistance of one's other hand to open the opening to permit such hand's entrance. In this manner, a pet owner is able to securely attach the leash muff onto one or more differently configured/shaped retractable leashes, and once secured, can readily insert one of their hands into the open-ended leash muff entrance so that they can grip and operate the locking features of the retractable leash. In preferred embodiments, the leash muff of the present invention, unlike prior art devices, does not possess a feature such that the open end is closed or secured against the wrist or arm portion of the pet owner, as there is preferably a fairly loose contact with the person's wrist or arm region and the open end largely retains its open shaped configuration, permitting easy exiting from the leash muff and reentrance thereto, as desired by the pet owner.

In various embodiments, the invention is directed to a hand and animal leash cover that includes a semi-rigid or rigid outer shell configured to surround an individual's hand while holding a leash retracting device. The outer shell includes a front end with a leash opening with a diameter larger than the width of the housing of the leash retracting device, such opening configured to securely but reversibly attach to the exterior body (around its circumference) when in use and engaged to the retractable leash. The other end of the leash cover (which is similar to a tubular configuration when not engaged with a retractable leash) is designed to facilitate a person's hand to readily enter and exit such opening without obstruction or deformation of the tubular configuration of such opening. In some embodiments, the leash cover has a generally slightly conical configuration such that the narrow end contacts the retractable leash housing/body and the wider end facilitates the entrance of a person's hand into the leash cover. The leash cover preferably does not extend the entire length of the retractable leash body, but instead, extends preferably only up until the aperture through which the leash enters/exists the housing. Formed on the other end of the leash cover is an opening for a human hand, dimensioned so that a user can grip the handle of the retractable leash and operate its features, such as a leash lock, a toggle leash-locking feature, etc. The outer shell is at least semi-rigid so that it maintains its shape and does not collapse upon itself when a human hand is not inserted therein. No straps, elastic bands or other types of closure members are employed to close off the hand entrance/exit opening. Instead, the opening remains open to receive a hand and is configured to conform around a user's wrist (preferably via a fur internal lining around the opening) and where the opening is in contact with a person's coat sleeve, thus preventing cold air to get inside of the leash cover. This structure also acts to reduce heat loss while facilitating the easy engagement and disengagement of a person's hand when grasping the retractable leash device when the leash cover is in place.

In one embodiment, a leash cover for a retractable leash includes a tubular member having a first and second end, with the first end configured to facilitate a human hand entering the first end. The first end retains an open configuration even when a human hand is not inserted. The second end may be formed using an elastomeric material configured to stretch over a girth of the retractable leash at a midportion of the retractable leash so as to hold the tubular member in a static position at about the mid-point on the retractable leash. More precisely, the second end of the leash cover is positioned between the locking mechanism on the top-most portion of the retractable leash and the area (near the leash housing's leash aperture) where the leash exits and enters the retractable leash. The first end of the tubular member extends beyond a gripping portion of the retractable leash by at least 3 inches—and around the wrist region or slightly beyond it of a person wearing the leash pocket, so as to provide the desired protection from cold and adverse weather conditions. To avoid confusion, as the invention is described herein, the inventor often uses certain terms interchangeably, namely cover, mitt, pocket, shell, tubular member, cylindrical member, etc., appreciating that one of skill in the art will understand the object being referred to. It should be understood that the leash cover referred to herein may therefore alternatively be denoted as being a "leash mitten," "leash sleeve," "leash muff," "leash pocket", etc. Importantly, in preferred embodiments, the first end of the tubular member is devoid of any constricting element, such as an elastic band or cinching cord, designed to constrict the first end around a wrist of a user. This distinguishes the present invention from the prior art devices that attempt to provide a way to keep a pet owner's hand warm while on a dog or cat walk by employing the constriction of gloves and mittens around the pet owner's wrist or arm so as to preclude cold air from entering. But one of the main points of the present invention in various embodiments is that a pet owner needs to be able to quickly disassociate his/her hand from the retractable leash without interference from a constricted wrist/arm feature intended to provide better warmth to the user. A dog owner needs to promptly dissociate from the retractable leash when the dog defecates, and the owner needs to have his/her hands free to pull out a plastic bag to retrieve the dog's waste product. The prior art devices restrict and complicate this maneuver by restraining the pet owner's hand within the warm confines created by the wrist securing mechanisms. In contrast, the open end of the tubular member of the present invention remains open so that a pet owner can immediately dissociate from the retractable leash. Given the adequate protection from adverse weather and cold provided by the present invention, especially in certain embodiments that provide for chemical warming products to assist in generating a warm environment within the tubular structure when it is associated with a retractable leash, the absence of a wrist or arm constricting element can be seen as a true advantage. In other words, embodiments of the present invention are devoid of an elastic or cinched cord feature that would cause the first end of the tubular structure to be constricted. Moreover, the present invention does not include the covering of the entire leash housing as do some prior art constructs.

With respect to the length of the leash cover, it is preferably long enough to contact a user's coat sleeve such that cold air entering the leash cover is hindered. In certain embodiments, there may be an accordion-like feature that permits the length of the leash cover to be adjusted to lengthen or shorten the cover. The first end can also be rolled or folded onto itself to adjust for desired lengths and/or to regulate the heat inside the cover.

In preferred embodiments the leash cover retains a tunnel-like or cave-like configuration or otherwise presents a tubular design and configuration such that a user can readily insert his/her hand into the leash cover, with no need to navigate a compressed end or folds in the cover's of prior art devices. Preferred embodiments have a closure mechanism at the end of the leash cover that contacts around the leash body so as to preclude flow of cold air between the leash cover and the body of the retractable leash. In a preferred embodiment, use of head liner material appropriately arranged facilitates the stretchiness around the leash housing, thus making it unnecessary to employ a separate elastic band around the inner circumference of the second end. Head liner material generally stretches in one direction but not in another transverse direction, making it particularly suitable for the present invention. Moreover, because head liner material has a foam composition, it inherently has thermal attributes and structural integrity that makes it particularly suitable for many embodiments. In several embodiments, however, an elastic band is employed around the circumference of the end of the leash cover that contacts the leash body so that the leash cover is reversibly but reliably positioned on the leash body, both retaining the leash cover in position and precluding cold air from being able to pass through the space between the leash body and the leash cover. In certain embodiments, other types of securing mechanisms may be employed, including a wire or reversibly bendable plastic extension that is able to wrap around the leash cover to secure it to the leash body at a desired position on the leash body, e.g. covering the pistol grip and extending just short of the aperture where the leash enters and exits the retractable leash body. In still other embodiments, a snap or hook and loop structure is employed, positioned so that when connected, the material of the cover closely contacts a curved feature of the covered leash housing, thus providing for a way to largely preclude movement of the cover on the leash housing when the snap or hook/loop structures are connected.

In certain embodiments, the leash cover includes one or more pockets, preferably located on the interior of the leash cover so as to enable a chemical heating pod to be placed therein so as to provide heat to the interior of the leash cover while a user's hand is inside. Pockets may also be provided on the exterior of the cover to accommodate waste bags, keys, etc. In certain embodiments, the leash cover is provided in a kit along with at least one chemical heating pod, as well as with a retractable leash.

One aspect of the present invention is that the leash pocket material is either suitably flexible so that a person's thumb can readily reach and manipulate the locking element of the retractable leash, or the leash pocket has a specific region that provides such a space, e.g. by a separate raising of the material around the locking element such that a person's thumb can access the same.

While certain embodiments include lightweight foam-like material (such as head liner material) that has sufficient stiffness to not collapse on itself, and thus maintains the first end in open position such that a human hand can enter the open end, other embodiments can include stiffer material, such as a plastic conical or a funnel-like shaped construct and insulative material, like fur, soft fleece, etc. can be either fixedly attached thereto (providing a comfortable lining to the tubular portion of the leash pocket.

In preferred embodiments, the second end is secured around the girth of the retractable leash housing between the locking mechanism on the top of the housing, and the exit/entrance aperture of the leash. In various embodiments, different sized leash pockets are contemplated, as well as suitably configured ones, so as to comport with the size and designs of various retractable pet leashes. While in a preferred embodiment, a "one-size-fits all" is contemplated, such that the elasticity of the second end of the leash cover (i.e. the end that contacts and reversibly secures the leash cover to a retractable leash device) is sufficient to enable it to surround the girth of such devices, regardless of their physical configuration, one of skill in the art will appreciate how to morph the particular aspects of the presently disclosed invention in a manner that facilitates providing a leash pocket that achieves the functional and structural attributes herein disclosed and thus, all such modifications to the inventive aspects of the present invention should be understood to also be included within the scope of the claimed embodiments. The cinching or securing of the second end around the retractable leash can be achieved in various ways, including providing an elastic band around the second end material (either its exterior or interior circumference) such that it can be stretched to fit over the wider sections of the leash but can cinch around the narrower portion of the leash to hold the leash cover in place.

As described in various embodiments, strings, cords, straps or other similar structures may be employed to preclude the leash cover from slipping off the leash housing body, for example, in circumstances where the elastic band that surrounds the end of the leash cover that contact the leash body is insufficient to firmly connect the leash cover to the leash housing body. Thus, certain embodiments employ a restraining strip, band or string, etc., that secures the distal portion of the leash housing to the cover, but does not cover the entire leash body as do several prior art devices where an encompassing mitten is employed. In the embodiments of the present invention, the leash cover does not extend over the region of a retractable leash aperture where the leash exits and enters. As also described herein, other hook and loop connecting elements can be used to reversibly attach the leash cover to a leash body, for example, with a hook material provided on the leash cover and a loop material being provided on the leash body. Velcro™ can be used—a small amount at top (or other places) to prevent the leash cover from slipping on the typically smooth surfaces of retractable leashes.

The present invention further comprises a method for keeping a pet walker's hands warm by employing the use of one embodiment of the present invention. Thus, the method involves providing one embodiment of the present invention and attaching it to a retractable leash and having a user extend their hand into the leash cover to grip a retractable pistol grip of a leash body.

The present invention can properly be viewed as a teaching away from the prior art devices as the prior art believed that one had to entirely close the hand entrance, as well as surround entirely the leash housing body itself, to accomplish the objective of maintaining the warmth of a user's hands while walking a dog or other pet in cold weather conditions. What the prior art did not appreciate, however is that when walking in cold weather, the person will typically have on puffy warm clothes (like a parka)—and the leash cover or leash cover's edge will contact the same to limit the cold air that will enter the leash cover. Moreover, about half the physical material is employed with the present invention as compared to the prior art devices, as there is no need to cover the front portion of a leash body to achieve the principal objective of maintaining warm conditions for a user's hands while gripping a retractable leash in cold weather.

Another feature in preferred embodiments of the present invention is that the leash cover includes a raised area around the locking lever region of a retractable leash body so that a user can readily operate the locking feature. While some embodiments achieve this via the use of flexible, stretchable material that provides for the user to simply stretch the material around the locking feature so that a thumb can access the locking feature, other embodiments employ a more rigid feature that contacts the top or sides of the leash body such that the leash cover, when secured to the leash body, is raised up on that region so that a user's thumb can operate the locking feature. Such physical structures can take many forms, for example, a plastic bubble region that makes room for the user's thumb and that is within the interior of the leash cover. Thus, in various embodiments, a preformed elevation around the locking mechanism is provided inside the cover so that the compressive forces of the material surrounding the thumb won't unduly inhibit access to the locking mechanism.

The present invention is devoid of a tightening cord to further enclose the end of the leash cover around a user's wrist region, as such a feature is not required because cold air is sufficiently precluded from entering the leash cover due to the steric hindrance caused by the user's clothing adjacent the end (especially when encircled in fur) of the leash cover.

In making embodiments of the leash cover, the cutting of material in a fashion to form a tapered edge such that the narrow region of a retractable leash can be cinched with an elastic band, while the tapered extended material is joined, either using stitching, adhesive, or other joining means, such that the tubular nature of the cover—more accurately a slightly funneled tube, is created. The wider funnel area extends to around the wrist region, preferably extending so that the open ended funnel of the leash pocket contacts a user's warm clothing, such as the sleeve of a coat, more preferably having the open end contact or encircle the pet walker's coat sleeve such that it forms an effective block with respect to cold air entering the open end. The leash cover should be long enough to extend over the back end of a retractable leash and should preferably be of a length to reach and contact the warm clothing arm sections of parkas, coats, shirts, etc. such that the amount of cold air entering the leash cover is reduced when a person's wears the same.

In one particular embodiment, the leash cover is constructed using material that stretches in one direction only, with the perpendicular direction not stretching much. The direction that the material does stretch is oriented so that it forms a circle such that the closed circle ultimately formed is stretchy enough to facilitate the cover's passage over larger leash portions until it reaches a narrower region of the leash housing that can accommodate the contraction of the elastic material to secure the leash cover to the leash housing. The material that can be used in this regard is preferably head liner material or material similar to interior ceiling material used in automobiles. It is sufficiently rigid so that it retains its shape and an open entrance to permit hand access to a leash when the present invention is placed on a retractable leash housing. It is also soft and insulative such that it facilitates the creation of a warm space when a human hand is placed inside of the pocket. It is also somewhat breathable so that undue moisture does not build up inside of the pocket.

In preferred embodiments, one is able to attach-connect the tubular member to a retractable leash body by simply moving the first end over the pistol grip of a leash until the leash cover is positioned just prior to where the leash exits/enters the leash housing. So unlike some prior art leash covers, which require the entire leash to be encompassed, the present invention provides for a far simpler way to attach a cover to a retractable leash to afford a warm space and weather protection for the pet owner's hand when using the leash in cold weather conditions.

In one embodiment, a leash cover for a retractable leash includes a tubular member having a first and second end, with the first end configured to facilitate a human hand entering the first end. The first end retains an open configuration even when a human hand is not inserted—and is constructed of material that permits a cave-like structure into which a hand can be inserted. The second end preferably has an elastomeric material around its circumference and is configured to stretch over a girth of the retractable leash at a mid-portion of the retractable leash and to hold the tubular member in a static position at about a mid-point on the retractable leash. When the second end is positioned at the mid-point of the retractable leash, the first end of the tubular member extends beyond a gripping portion of the retractable leash by a distance sufficient to contact the coat of a pet owner gripping a retractable leash. In other words, the leash cover extends at least about 3 inches from the pistol grip portion of the retractable leash to provide cover and warmth for a user's hand when gripping the retractable leash. In preferred embodiments the first end of the tubular member is devoid of any constricting element designed to constrict around a wrist of a user. Similarly, preferred embodiments do not employ any flap or cover that can be closed around the opposite end (i.e. distal end) of the leash housing. Unlike some prior art covers that cover the entirety of a retractable leash, the present invention extends only about half way along a longitudinal axis of a retractable leash body and does not cover the retractable leash body at a point further than where the leash exits/enters via an aperture on the retractable leash body.

Preferred embodiments include an insulation layer inside the tubular member, which can be fur, or other soft and warm material, etc. similar to that used in gloves. In some embodiments, the insulation layer inside the tubular member is reversibly removable to enable the washing of the insulation material. Removable padding insulation is preferred so that the housing interior can be cleaned separately from the tubular leash cover housing itself.

In certain embodiments, the tubular member may be largely constructed of neoprene material or similar material that stretches, as it is able to retain heat and is sufficiently firm so that the cave-like tubular structure is maintained to permit a hand to enter and grasp a retractable leash handle.

In other embodiments, the tubular member has at least one of rigid or semi-rigid members extending along one of a longitudinal axis of the tubular member or a lateral axis of said tubular member, such that the rigid or semi-rigid members retain the open configuration of the second end of the tubular member. In such embodiments, the material being supported by the stays do not need to be rigid or semi-rigid themselves. In certain embodiments, at least three stays are employed to maintain the opening for a user's hands, with the stays supporting the material that otherwise comprises the leash cover.

In other embodiments, the tubular member has a pre-formed region at a top-most portion of the tubular member to facilitate the ability of a person to operate a leash-locking feature of the retractable leash with their thumb without interference by the tubular member. Importantly, whether the material employed for the tubular member is flexible enough to permit a pet owner's thumb to reach and manipulate the locking leash functions, or alternatively a more rigid space is provided to permit space and room for a thumb to operate such a leash-locking feature.

Various embodiments can have means for securing (reversibly preferably) to the body of a retractable leash, which may comprise elastic bands, locking levers that pull a strap and secure the same around the tubular member and around the leash body so that the tubular member is in a fixed position, pull-strings that can be secured in a constricted manner to secure the tubular member around the leash body; and/or a snap or similar mechanism to reversibly secure a portion of the tubular member to a retractable leash body. VELCRO R™ attachments between the cover and the retractable leash housing or other hook and loop fasteners can be employed to achieve the desired function of reversibly securing the tubular member to the leash body by having, one end of the Velcro on the tubular member, with the other side of the Velcro™ construct on the leash body.

Certain embodiments include a more rigid tubular member, such as a plastic molded pre-formed mitten cover sized for the particular leash size and style (e.g. for a Flexi retractable leash). Such a rigid structure may have fur or other insulated material on its interior to provide a warm environment for a pet owner's hand. In preferred embodiments the device includes reflective material that suffices to keep a pet owner safe while walking their pet at night. Other embodiments include glow in the dark material, flashlight attachments, side pockets to accommodate items such as waste collection bags, treats, etc.

In still other embodiments, the tubular member can be entirely or partially transparent to facilitate visual operations of the locking features of the retractable leash. Heating elements can be provided inside the tubular member such as via a pocket positioned inside the tubular structure that can hold a chemical hand warmer pocket insert.

In still other embodiments, the creation of a warm confine for a pet owner's hand while gripping a leash, in particular a retractable leash with a pistol grip, is provided by having a "clam-shaped" article or taco-shaped" that has insulative padding on one side (the hand facing side) and with an exterior surface that preferably is water resistant. Such outer surface can therefore be similar to the exterior of clothing typically worn in winter months, such as parka material, canvas, etc., preferably water resistant and aet breathable. It can in some embodiments have other decorative features, such as rhinestones, various patterns, etc. to be attractive to the owner, and may have pictures or other prints on such surface to suit the desires of the pet owner. Preferably there is at least one reflective element or glow-in-the dark element, or both, on the exterior of the leash cover such that the wearer is visible at night when light reflect off of the same, or alternatively when simply in the dark. In alternative embodiments, aAt least one bendable component is associated with the physical covering for the hand such that the material can be reversibly "bent around" a person's hand when gripping a leash. Once the material is closed over the hand, typically from a position so that the folded material will correspond to the top-thumb portion of a person's hand, the "open" portion of the clam-like article will be toward the pinky region of the person's hand. The open region, formed between the two now-adjacent folded ends of the material comprising the article, can then be secured together to close the clam-like article so that cold air flow toward the person's hand can be reduced. In other words, when the clam-like article is wrapped around a person's hand, such hand gripping a leash, the wearer is provided with immediate coverage from the cold exterior conditions. The flexible article thus somewhat resembles a flattened leash cover with one side open (at the bottom when placed around the hand/leash grip so as to provide a way to block cold air from reaching the wearer's hand.)

In certain embodiments, the tubular member may have a connecting feature that extends the longitudinal extent of the tubular member (e.g. a zipper that runs from the first to the second end; a hook and loop feature that reversibly connects the ends of the tubular member together).

In one embodiment, the leash cover comprises a portion of a tubular, lightweight material, such as plastic, with soft comforting material applied or connected to the interior thereof, such that when a person's hand is inserted into the tubular structure, it is in a soft and warm environment. The end through which a person's hand enters is preferably round in shape, but may be egg-shaped or elliptical, etc., and in any event is shaped to permit a person's adult hand from entering and in being able to accommodate gripping of a pistol grip of a retractable leash. The end of the leash cover that touches the retractable leash is preferably formed into a shaped configuration such that it sufficiently and substantially conforms to the outer confines of the retractable leash body at a position that encircles the pistol grip portion of the leash and terminates prior to the exit/entrance aperture of the recoiling leash.

Other embodiments employ an elastic band that extends circumferentially around the leash housing so that the tubular cover does not slip off the leash body. A separate elastic band that secures the cover to the distal end of the leash housing is employed to further seure the cover to the housing. Different from the prior art, however, such a band does not encompass the entire leash body, but rather simply extends to a distal end portion of the leash housing body to secure the tubular member in place. Instead of an elastic band, a static strip can be used with a buckle that can be adjusted for the length of the strip and to secure the connected strip around the leash body's distal end.

Certain embodiments are directed to a hand and animal leash cover that includes a semi-rigid or rigid outer shell configured to surround an individual's hand while holding a leash retracting device. The outer shell includes a leash opening with a diameter slightly larger than the width of the housing of the leash retracting device, and that extends preferably only to the aperture through which the leash enters the housing. The outer shell is at least semi-rigid so that it maintains its shape and does not collapse upon itself when a human hand is not inserted therein. No straps, elastic bands or other types of closure members are employed to close off the hand entering opening, thus facilitating the easy engagement and disengagement of a person's hand when grasping the retractable leash device when the leash cover is in place.

One will appreciate that this Summary of the Invention is not intended to be all encompassing and that the scope of the invention nor its various embodiments, let alone the most important ones, are necessarily encompassed by the above description. One of skill in the art will appreciate that the entire disclosure, as well as the incorporated references, pictures, etc. will provide a basis for the scope of the present invention as it may be claimed now and in future applications. While embodiments of the invention have been illustrated and described, it is not intended that these embodiments illustrate and describe all possible forms of the invention. Rather, the words used in this specification are words of description rather than limitation, and it is understood that various changes may be made without departing from the spirit and scope of the invention.

DESCRIPTION OF PREFERRED EMBODIMENTS

Figure 1:
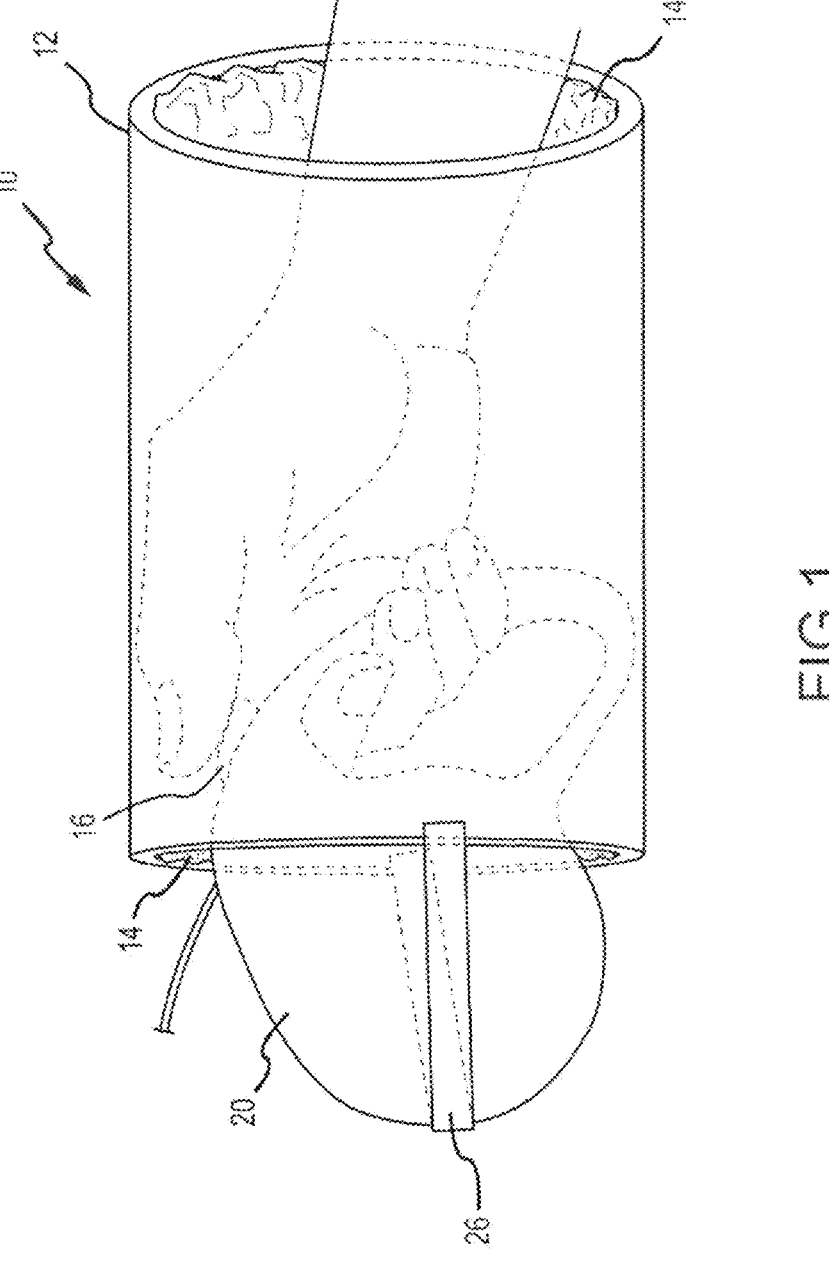
FIG. 1 is a side view of one embodiments of the hand/leash cover on a retractable leash with the leash extending forward through a front leash opening.
Figure 2:
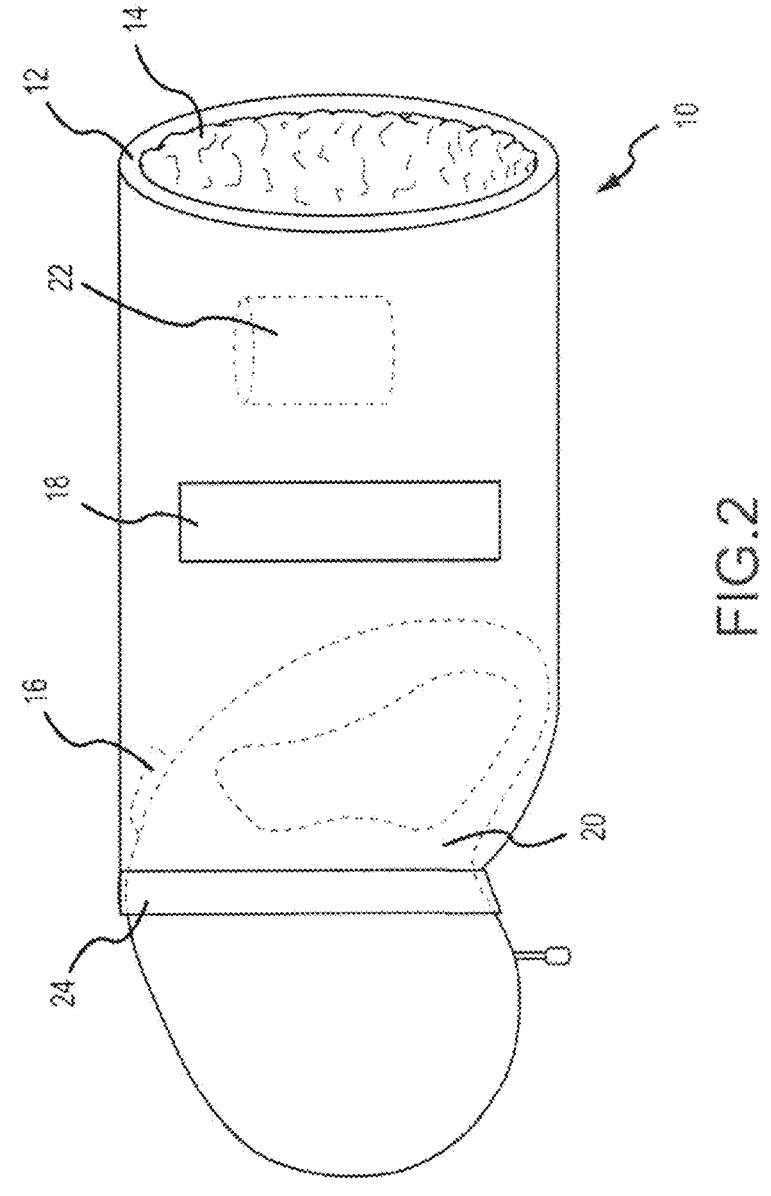
FIG. 2 is a side view of one embodiment of a leash cover that encompasses a waste bag feature attached to a retractable leash and that also depicts the tubular member having a pre-formed region at a top-most portion of the tubular member to facilitate the ability of a person to operate a leash-locking feature of the retractable leash with their thumb without interference by the tubular member.

FIGS. 1-2 show a hand and animal leash cover 10 that includes an outer shell 12 configured to surround an individual's hand while holding a leash retracting device 20 with a forward extending leash that includes a clip connector at its distal end that attaches to the neck collar or harness on a dog or pet.

Figure 3:
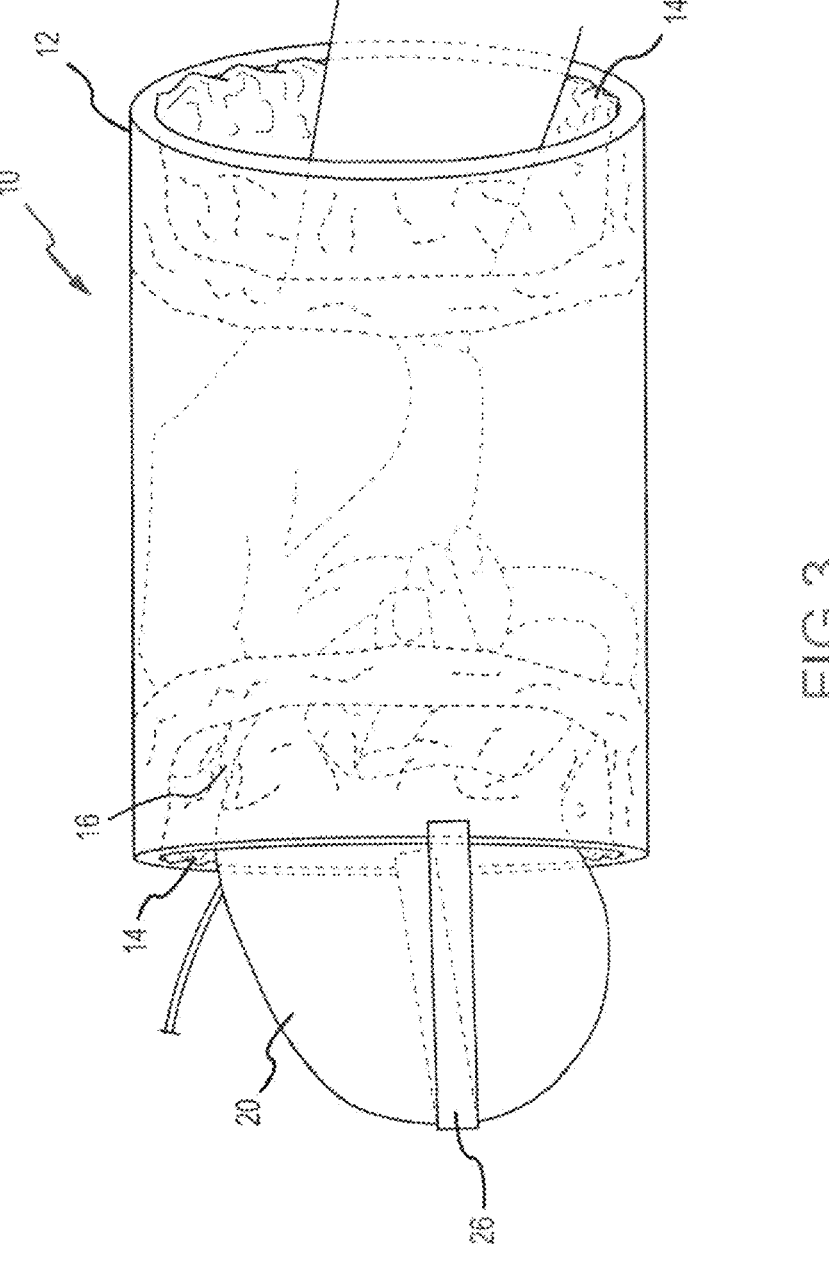
FIG. 3 is a side view of one embodiment of the hand/leash cover on a retractable leash with a strip of fur of about 1-2 inches that encircles each end of the cover.

FIG. 3 is a side view of one embodiment of the hand/leash cover 10 on a retractable leash 20 with a strip of fur 14 of about 1-2 inches that encircles each end of the cover 10.

The outer shell of a retractable leash device includes a leash opening/aperture through which the leash enters and exits. One objective of the present invention is to avoid having a leash cover that extends over such aperture in a manner that might interfere with its function.

Unlike certain prior art devices, embodiments of the present invention do not include the use of a separate hand strap that other devices employ to prevent cold air from contacting a user's hand once in a leash cover, nor does the present invention use a separate strap on the leash cover that a user may employ with their non-leash holding hand to temporarily grasp and hold the retractable leash when a dominant hand is removed from the constrictive gloves or mitts used with such prior art devices. Instead, due to the ability to simply grasp the retractable leash through the open end of the various embodiments disclosed herein, the ability to transfer the retractable leash between hands is far simpler. In short, the open end of the leash cover as described is preferably configured with adequate space so that the transfer of the retractable leash between hands is as easy as if the leash cover were not in place.

The outer shell 12 is preferably not made of non-rigid materials that have no ability to be firm enough to retain the shape of a tunnel or cave-like tubular structure that enables a user's hand to enter and exit with ease without the need to separately open the material to facilitate the same. Instead, the outer shell is at least semi-rigid and or constructed of firm enough material such that the shape of the outer shell always remains in a configuration that facilitates easy entry of a pet owner's hand, whether a human hand is inserted therein or not. The at least semi-rigid outer shell can be made of various suitable materials, including relatively stiff fabric (e.g. a canvas material) fabric, such as cotton or wool, or synthetic fabrics, such as nylon, polyethylene, polyurethane coated nylon, neoprene, head liner material, or a combination thereof. Preferably, the interior of the tubular leash cover includes an insulation inner layer 14 to provide comfort for the human user, preferably a strip of about 1-2 inches that encircles both ends of the cover.

Unlike prior art covers, certain embodiments of the present invention employ elastic elements to secure the cover to the leash housing—preferably right before the leash exit portion of the housing, thus avoiding the encircling of the entire leash housing, and instead, limiting the cover's extent of coverage to about half of the leash housing.

The following character numbers depict features of the present invention that are shown in the figures. leash cover 10; outer shell 12; leash retracting device 20; and insulation inner layer 14; and retractable leash locking features 16.

To reversibly secure the hand cover (otherwise referred to herein as a "leash muff" or "leash pocket") to the leash housing itself, a preferred embodiment includes a strap, preferably an elastic strap 26, that connects one side of the second end (the end that encircles the leash housing) to another side of the second end such that the tubular member is restrained against the leash housing due to the elastic constriction of the foremost portion of the leash housing being pulled back to the cylindrical structure by the elastic forces applied by the elastic strap 26. Such a strap 26 (preferably elastic) can be secured to the leash pocket via hook and loop structures, snaps, adhesive, etc.

FIG. 1 is a side view of one embodiments of the hand/leash cover on a retractable leash with the leash extending forward through a front leash opening.

FIG. 2 is a side view of one embodiment of a leash cover that encompasses a waste bag feature attached to a retractable leash and that also depicts the tubular member having a pre-formed region at a top-most portion of the tubular member to facilitate the ability of a person to operate a leash-locking feature of the retractable leash with their thumb without interference by the tubular member.

In preferred embodiments, the tubular shape of the leash cover 10 is further characterized by a certain rigidity within the leash cover, thereby permitting space around the retractable leash locking features 16 in a manner so that a person's fingers can manipulate such locking features 16 without hindrance. In other words, there is typically a slight bump on the top most portion of the leash cover 10 that accommodates a person's thumb, while their hand is within the tubular construct of the leash cover 10, to press on the leash locking features 16 of the retractable leash 20 with one's bare hand. This facilitates the easy manipulation of such features 16 despite the pet owner's hand being kept warm and dry from the elements but does not sacrifice the tactile feel experienced with one's bare hands. This unique shape characteristic of various embodiments of the invention 10 typically requires that more than a wrap around tubular structure be employed to make the lease cover 10. Rather, the lease cover 10 in various embodiments is provided with a topmost section that has an elevated region that is above and not in contact with the locking features 16 of the retractable leash 20. This region is sized to permit a person's thumb to manipulate the locking feature 16.

In various embodiments, at least a portion of the leash cover 10 comprises reflective and/or glow in the dark material 18 (e.g. on the exterior of the leash cover 10) so that a pet owner can more readily be seen at night when walking a pet. During use, the user's hand grips the pistol grip handle of the retracting device 20. Unlike prior art products, where the retractable leash device is located completely inside an outer flexible shell and where a wrist strap is employed to attach to a user's arm, the present invention employs a leash cover 10 that only partially covers the retractable leash 20, such that the leash opening of the retractable leash 20 is unobstructed, thus lessening the chances for interference with the retractable leash 20 operation and facilitating quick entrance and exit from the cover.

Other embodiments include glow in the dark material, flashlight attachments, side pockets 22 to accommodate items such as waste collection bags, treats, etc. Other embodiments employ an elastic band 24 that extends circumferentially around the leash housing so that the tubular cover does not slip off the leash body.

To comply with written description and enablement requirements, all references cited herein, including but not limited to published and unpublished applications, patents, and literature references, are incorporated herein by reference in their entirety and are hereby made a part of this specification. To the extent publications and patents or patent applications incorporated by reference contradict the disclosure contained in the specification, the specification is intended to supersede and/or take precedence over any such contradictory material. Incorporated herein by this reference are the following US patent publications: 20160058082 to Stone; 5678249 to Smith; 5699632 to Stout et. al.; 5375263 to Cuccia; 5740700 to Redmond; 5345610 to Belanger; 2018/0338474 to Bogdahn et. al.; 8,826,865 to Bogdahn, et. al.; 2011/0155076 to Charette; 20160302499 to McMahon; and 20120186539 to Johnston.

One of skill in the art of life must strike a balance of caution and of exercising a free spirit in all aspects of making the journey to the end. Many inventions arise from a later appreciation that what was seen at the time to be a mistake, was actually a solution to a problem that may not yet have even been pondered. But in other situations, what may appear to be accidents may instead be purposeful acts. One should carefully consider how competitors may have spun their stories to arrive at the truth. And remember, a dog is the only thing on earth that loves you more than you love yourself. Dogs are not our whole life, but they make our lives whole. Cautious of disrespecting the Fates that inhabit Meade Lane, a preferred moniker for the product described herein is "leash pocket"—which comports with the names used on the lane in the past to generate fortunes, e.g. Hot Pockets and Popsocket.

While specific embodiments and applications of the present invention have been described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention. Those skilled in the art will appreciate that the conception upon which this disclosure is based, may readily be utilized as a basis for designing of other methods and systems for carrying out the several purposes of the present invention. It is important, therefore, that the claims be regarded as including any such equivalent construction insofar as they do not depart from the spirit and scope of the present invention.

What is claimed is:

1. A method for keeping a pet owner's hand warm when walking a pet using a retractable leash, comprising, providing:

a tubular member having a first and second end, the first end configured to facilitate a bare human hand entering the first end, so that a pet owner can grip a handle with their bare hands, the second end having an elastic material configured to laterally stretch over a girth of the retractable leash at a mid-portion of the retractable leash and to hold the tubular member in a static position at the mid-portion;

wherein when the second end is positioned at the mid-portion of the retractable leash, the first end of the tubular member extends beyond a gripping portion of the retractable leash by at least 3 inches; and wherein an insulation layer encircles an interior circumference of both the first and second ends and does not extend to a region between the first and second ends; and, inserting a bare hand into the first end of the tubular member to allow the pet owner to grip the handle; and connecting the elastic material to the second end, said second end having a first side and a second side and the elastic material connecting to said first side and said second side.

2. A method for keeping a pet owner's hand warm when walking a pet using a retractable leash, comprising, providing:

a tubular member having a first and second end, the first end configured to facilitate a bare human hand entering the first end, so that a pet owner can grip a handle with their bare hands, the second end having an elastic material configured to laterally stretch over a girth of the retractable leash at a mid-portion of the retractable leash and to hold the tubular member in a static position at said mid-portion on the retractable leash, wherein the elastic material is connected to the second end and stretches over the mid-portion of the retractable leash to secure the second end to the retractable leash;

wherein when the second end is positioned at the mid-portion of the retractable leash and the first end of the tubular member extends beyond a gripping portion of the retractable leash by at least 3 inches;

wherein an insulation layer encircles an interior circumference of both the first and second ends and does not extend to a region between the first and second ends, and wherein the insulation layer does not extend outwardly from the second end; and inserting a bare hand into the first end of the tubular member to allow the pet owner to grip the handle.

3. The method as set forth in claim 2, further comprising wrapping the elastic material around a distal portion of the retractable leash.

4. The method as set forth in claim 2, further comprising avoiding any reduction of the size of said second end.

5. The method as set forth in claim 2, further comprising retaining said first end in an open configuration even when a human hand is not inserted in said first end.

6. The method as set forth in claim 2, further comprising stretching the second end of the tubular member over the girth of the retractable leash so as to preclude a flow of cold air between the tubular member and the retractable leash.

7. The method as set forth in claim 2, wherein the insulation layer comprises fur.

8. The method as set forth in claim 2, further comprising only partially covering the retractable leash such that an aperture through which a retractable leash exits is unobstructed.

9. A method for keeping a pet owner's hand warm when walking a pet using a retractable leash, comprising, providing:

a tubular member having a first and second end, the first end configured to facilitate a bare human hand entering the first end, so that a pet owner can grip a handle with their bare hands, and the second end having a first side and a second side and an elastic material connected to said first side and said second side, said elastic material configured to laterally stretch over a girth of the retractable leash at a mid-portion of the retractable leash and to hold the tubular member in a static position at the mid-portion;

wherein when the second end is positioned at the mid-portion of the retractable leash, the first end of the tubular member extends beyond a gripping portion of the retractable leash by at least 3 inches;

wherein an insulation layer encircles an interior circumference of both the first and second ends and does not extend to a region between the first and second ends;

wherein the elastic material comprises a laterally extending strap that is configured to wrap around a distal portion of a retractable leash; and inserting the pet owner's hand into the first end of the tubular member so that the pet owner can grip the handle.

10. The method as set forth in claim 9, further comprising stretching the second end of the tubular member over the girth of the retractable leash so as to preclude a flow of cold air between the tubular member and the retractable leash.

11. The method as set forth in claim 9, further comprising only partially covering the retractable leash such that an aperture through which a retractable leash exits is unobstructed.

12. The method as set forth in claim 9, further comprising retaining said first end in an open configuration even when a human hand is not inserted in said first end.

13. The method as set forth in claim 9, further comprising wrapping the laterally extending strap around a distal portion of the retractable leash.

14. The method as set forth in claim 9, further comprising avoiding any reduction of the size of said second end.

\* \* \* \* \*